United States Patent
Colbachini

(10) Patent No.: US 7,363,946 B2
(45) Date of Patent: Apr. 29, 2008

(54) FLAME-RESISTANT TUBE FOR BRAKING SYSTEMS

(75) Inventor: Giuseppe Aldinio Colbachini, Cervarese S. Croce (IT)

(73) Assignee: Ivg Colbachini S.p.A., Cervarese S. Croce (Padova) (IT)

( * ) Notice: Subject to any disclaimer, the term of this patent is extended or adjusted under 35 U.S.C. 154(b) by 0 days.

(21) Appl. No.: 11/369,383

(22) Filed: Mar. 7, 2006

(65) Prior Publication Data

US 2006/0216449 A1 Sep. 28, 2006

(30) Foreign Application Priority Data

Mar. 7, 2005 (IT) .......................... MI2005A0348

(51) Int. Cl.
*F16L 11/00* (2006.01)
(52) U.S. Cl. .................... 138/126; 138/130; 428/36.91
(58) Field of Classification Search ............... 138/125, 138/126, 130; 428/36.91
See application file for complete search history.

(56) References Cited

U.S. PATENT DOCUMENTS

| | | | | |
|---|---|---|---|---|
| 3,053,724 A | * | 9/1962 | Galloway ................... | 156/258 |
| 3,117,597 A | * | 1/1964 | Gallagher et al. .......... | 138/125 |
| 3,123,102 A | * | 3/1964 | Frieder et al. .............. | 138/125 |
| 3,177,900 A | * | 4/1965 | Sharp ......................... | 138/125 |
| 3,481,368 A | * | 12/1969 | Linger et al. ................ | 138/125 |
| 3,866,633 A | * | 2/1975 | Taylor ........................ | 138/130 |
| 4,111,237 A | * | 9/1978 | Mutzner et al. ............ | 138/125 |
| 4,192,351 A | * | 3/1980 | Henry ........................ | 138/126 |
| 4,213,485 A | * | 7/1980 | Ottewell et al. ............ | 138/130 |
| RE31,047 E | * | 10/1982 | Ross .......................... | 138/130 |
| 4,366,746 A | * | 1/1983 | Rosecrans ................... | 91/467 |
| 4,522,235 A | * | 6/1985 | Kluss et al. ................ | 138/130 |
| 4,585,035 A | * | 4/1986 | Piccoli ....................... | 138/127 |
| 4,675,221 A | * | 6/1987 | Lalikos et al. ............. | 138/110 |
| 4,734,305 A | * | 3/1988 | Sugimoto et al. .......... | 428/36.2 |
| 5,182,147 A | * | 1/1993 | Davis ........................ | 428/34.4 |
| 5,183,079 A | * | 2/1993 | Blin ........................... | 138/110 |
| 5,507,320 A | * | 4/1996 | Plumley ..................... | 138/126 |
| 6,450,206 B2 | * | 9/2002 | Ishikawa et al. ........... | 138/126 |
| 6,926,038 B1 | * | 8/2005 | Cook et al. ................ | 138/127 |
| 2006/0100328 A1 | * | 5/2006 | Goossens ................... | 524/115 |

* cited by examiner

*Primary Examiner*—James Hook
(74) *Attorney, Agent, or Firm*—James V. Costigan; Hedman & Costigan, P.C.

(57) ABSTRACT

A tube for railroad pressurized air braking systems, which tubs can resist up to a free-flame temperature of about 700-800 ° C. for at least 15 minutes, and has a tube substrate made of a synthetic rubber, at least a reinforcement fabric material layer arranged above the tube substrate and a further synthetic rubber layer coating the at least a reinforcement fabric material layer, the tube having moreover at least a layer of a heat resistant material arranged above the synthetic rubber layer and coated by an cuter synthetic rubber layer.

4 Claims, 8 Drawing Sheets

FLAME-RESISTANT TUBE FOR BRAKING SYSTEMS

BACKGROUND OF THE INVENTION

The present invention relates to a flame resistant tube for braking systems.

The field of the invention is that of the ducts, generally comprising rubber flexible hoses, which are used to convey pressurized air to motor vehicle, railroad vehicle (such as railroad car and locomotive,) braking systems and the like.

In such an application field, it is necessary to provide the braking system with the required safety properties and efficacy, for resistance against fires.

Prior rubber tubes or pipes, used for conveying pressurized air to the above mentioned braking systems, have not been found as suitable to resist against high temperatures which, as frequently occurs in a free-flame condition, may also have values of 700-800° C.

In a fire event, moreover, the tube must resist, for a time as long as possible, against the mentioned temperatures, while preserving its pneumatic conveying function.

Moreover, in the railroad field, also the materials for making the mentioned rubber ducts, must meet a plurality of specific standards, related to the releasing of toxic combustion or flue fumes.

SUMMARY OF THE INVENTION

Accordingly, the main object of the present invention is to provide a novel tube or hose construction, to be used in braking systems, which has a very high resistance against a free-flame condition.

A further object of the present invention is to provide such a braking system tube which is adapted to resist, for a time as long as possible, against temperature of 700-800° C.

A further object of the invention is to provide such a tube, which, in addition to the above mentioned flame resistant properties is also adapted to reduce the opacity and toxicity of the combustion fume emissions.

According to one aspect of the present invention, the above mentioned objects, as well as yet other objects, which will become more apparent hereinafter, are achieved by a tube for braking systems, according to claim 1.

Preferred embodiments of the inventive tube are defined in the remaining claims.

With respect to prior braking system tubes, the inventive tube provides the advantage that it can resist to a temperature up to a free-flame value, i.e. a temperature of the order of 700-800° C., for a time of at least 15 minutes, while preserving those functional properties, such as a pressure resistance up to 5 atm, which are required in a railroad field application.

BRIEF DESCRIPTION OF THE DRAWINGS

The mentioned and other objects, advantages and characteristics of the invention will become more apparent hereinafter from the following detailed disclosure of a preferred, though not exclusive, embodiment of the tube according to the invention which is illustrated, by way of a non limitative example, in the figures of the accompanying drawings, where.

DESCRIPTION OF THE PREFERRED EMBODIMENTS

Figure 1:
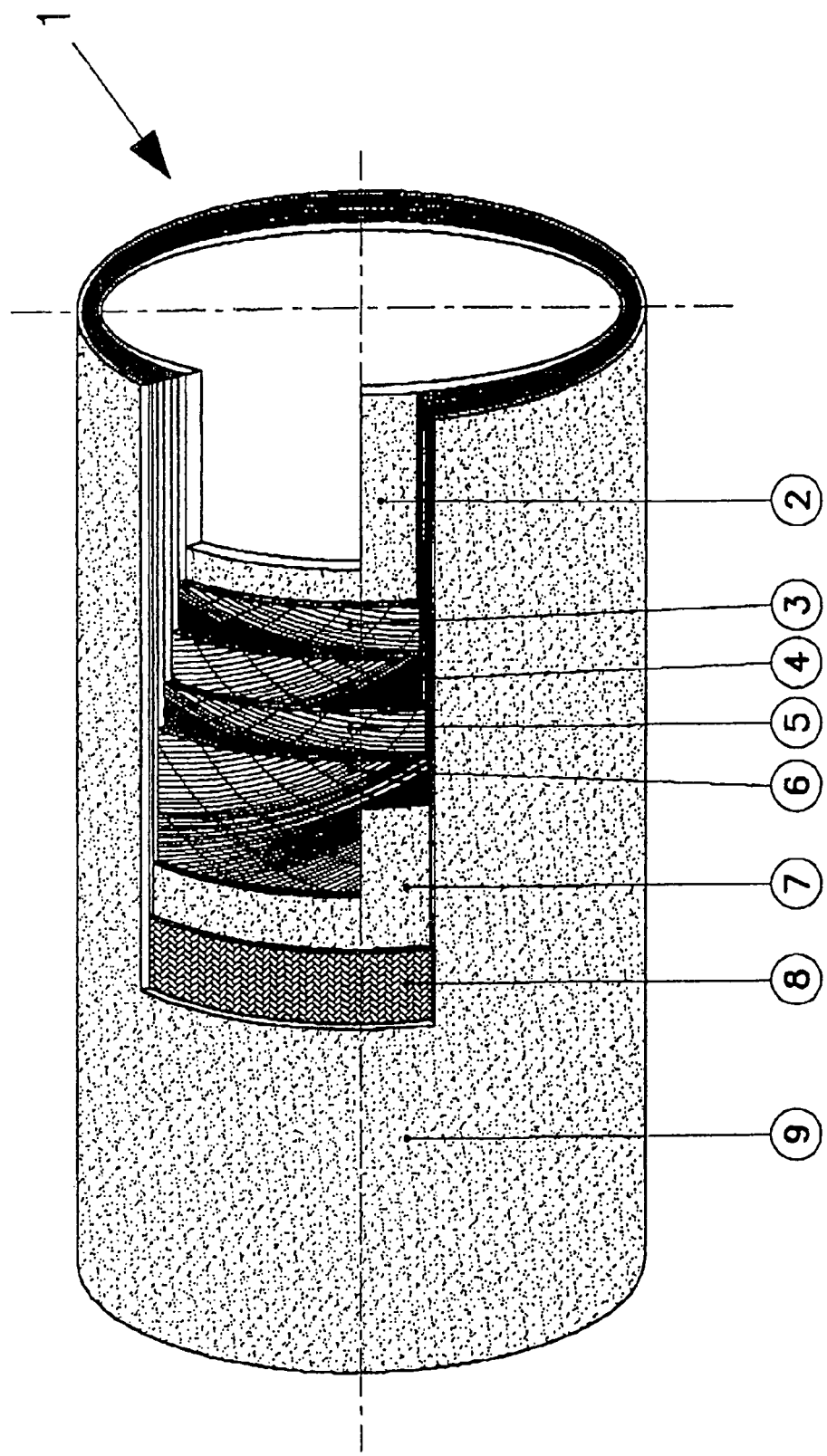
FIG. 1 shows, in a partially broken away form, a first embodiment of the tube according to the invention.

The tube shown in FIG. 1, and which has been generally indicated by the reference number 1, has been designed for use in pneumatic braking systems in general and, more specifically, in railroad car and locomotive braking systems.

More specifically, said tube 1 comprises a tube substrate 2 or sublayer, which comprises a smooth synthetic rubber layer.

Said substrate 2 is coated by a plurality of high toughness reinforcement fabric elements 3, 4, 5, 6 which are overlapped onto one another and rubberized by the same material forming said substrate 2.

On the top of the reinforcement fabric elements, a synthetic rubber layer 7, made of the same material as that of the substrate 2, is arranged.

The rubber layer 7 is then coated by a heat resistant material layer 8, which is preferably made of a silicon based compound, for example a glass fiber material, a silicon fiber material, a ceramics fiber material or a mixed fiber material. The assembly is then coated by a further synthetic rubber layer 9, having the same composition as the underlying layers 2 and 7.

Advantageously, according to the invention, the above mentioned layers 2, 7 and 9 of the tube 1 are made starting from flame resistant elastomeric synthetic compounds, according to the Class 3 AFNOR NF F16-101 and DIN 5510-2 Standards.

Figure 2:
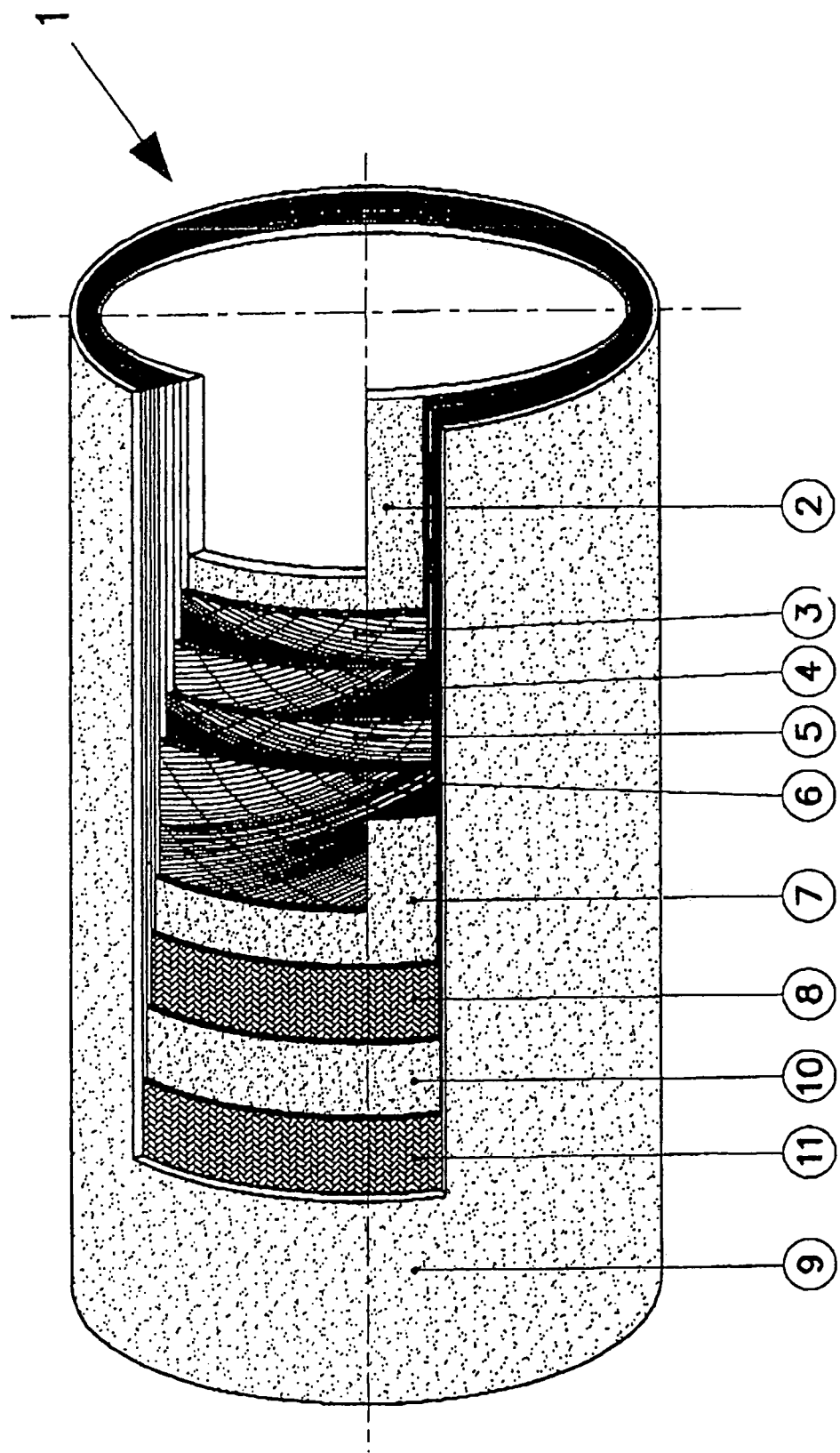
FIG. 2 is a further broken-away view showing a modified embodiment of the tube or hose shown in FIG. 1.

In the modified embodiment shown in FIG. 2, the tube 1 comprises, in addition to the substrate 2, reinforcement fabric material elements 3-6, rubber layer 7 and heat resistant material layer 8, an additional synthetic rubber layer 10 and a further heat resistant material layer 11.

Also in this case, the tube 1 construction is covered by an outer layer 9 made of a synthetic rubber material.

Said additional layer 11, which is peculiar to this embodiment of the tube 1, can be made of the same material forming the underlying layer 8, or of a different material.

To test the flame resistant properties of the braking system tube according to the invention, specifically designed for railroad field applications, the following tests have been carrier out.

Fire Resistant Tests on Five Braking System Tubes Reinforced by a Flame Resistant Fabric Material These tests were performed to evaluate the fire performance of five railroad car braking system pressurized air tubes having the following construction (from the inside to the outside thereof):

- a substrate 2 made of a smooth synthetic rubber material,
- four reinforcement fabric material elements 3-6, overlapped onto one another and rubberized,
- a synthetic rubber coating 7,
- a temperature resistant fiber fabric layer 8,
- a rubber layer 10 overlapped on or coating said layer 8,
- an additional layer 11 made of a temperature resistant fiber fabric material, and
- an outer layer 9 made of an abrasion resistant rubber material.

The tested braking system tubes, which have been custom-prepared for testing were new, i.e. not used.

For performing a comparing with other braking system tubes, the same positions of the braking system tubes and burners have been selected.

In the tests, each braking system tube was clamped at a height of 18 cm above a top corner of the burner, i.e. at 34 cm above the test room floor.

The tube was then ignited at the center thereof by a triangle burner, according to the EN 13813 Standard, and the temperature variations at given times were measured by NiCrNi thermal-elements and a measurement system supplied by the National Instruments, and electronically recorded.

The temperature measurements were carried out within a time period of 1 second.

The braking system tube pressure was measured, for the tests 1 and 3, by a pressure gauge "Digibar", supplied by the Company Hottinger Baldwin Messtechnik Darmstadt and, for the tests 4 and 5, by a pressure gauge of the Company Jumo (Article 9302/80085).

The brake system tube was supported by two supporting elements, and the temperature measurement thermocouples were arranged, coupled by a wire, at the following points:
 four thermocouples under the tube (at the center two pieces and at a distance of 25 cm from the left and right ends)
 inside the tube (at the center thereof) at the top of the flame, and
 above the tube, at about its half.

In the testing burning procedure, the braking system tubes were brought to a pressure from 5.3 to 5.7 bars and the evolvement of the tests was filmed and, for safety reasons, observed through a monitor.

At the end of the test No. 1, it has been found that the tube, contacting the free flame, did not burst, but it became slightly permeable to air, since the temperature resistant fiber fabric material provided a stabilizing effect.

Figure 3:
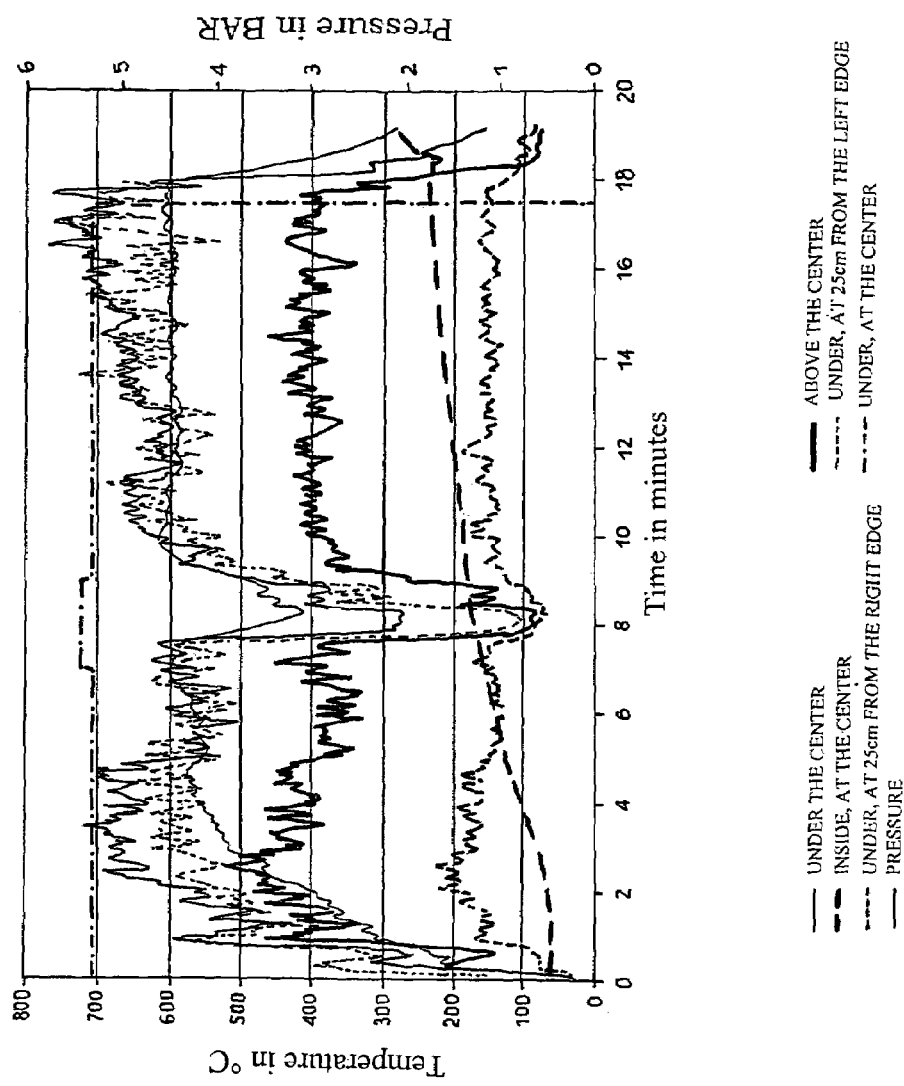
FIGS. 3 to 7 show the pressurized air sealing properties of the tube, with respect to time and temperature.

The measurements were performed starting from an inner tube temperature of 60° C. (the burner being preliminarily ignited). At minute eight, a ventilation system was turned on to suck the soot generated by the burner away and, after 17 minutes from the start of the test, the braking system tube became permeable (FIG. 3).

Figure 4:
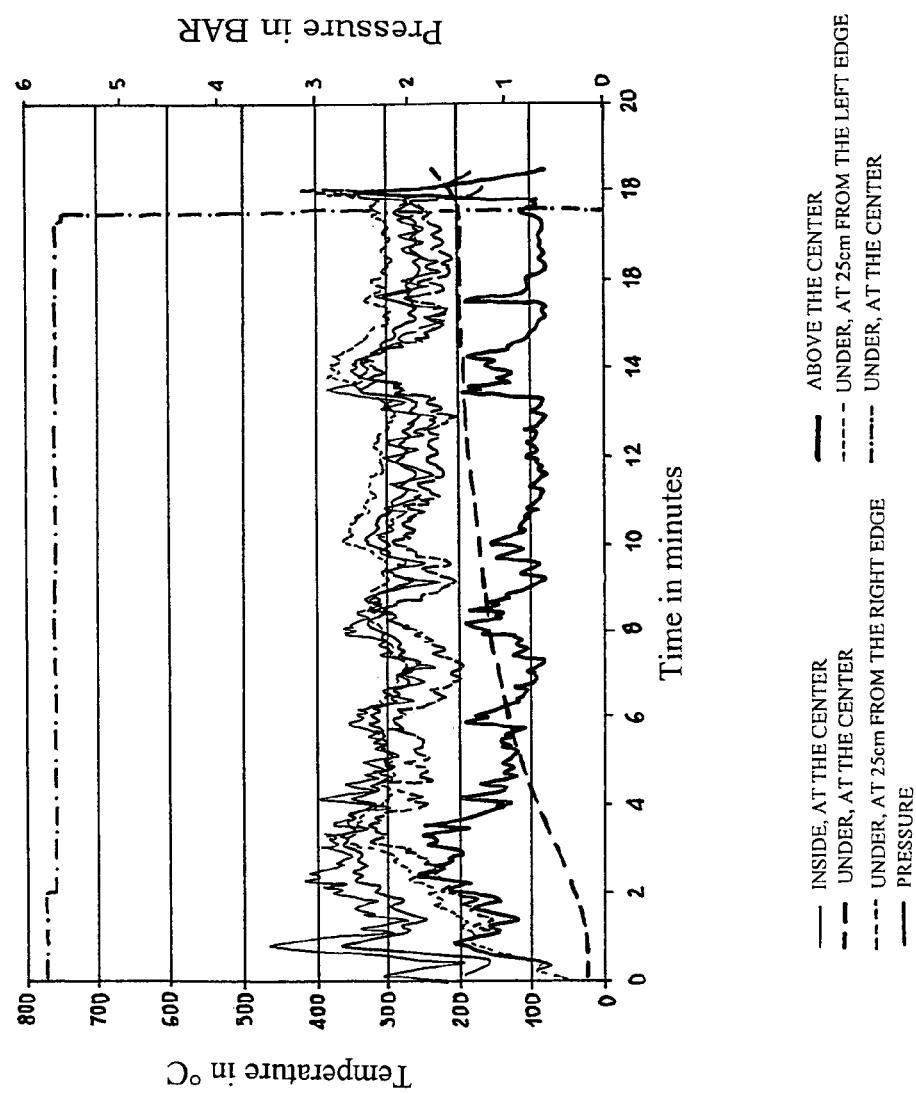

In the test No. 2, the flame temperature was held at a lower value than that of the test No. 1, because of a different performance with respect to the flame and small modifications of the burner position. Also in the test No. 2, the braking system tube became permeable after 17 minutes (FIG. 4).

Figure 5:
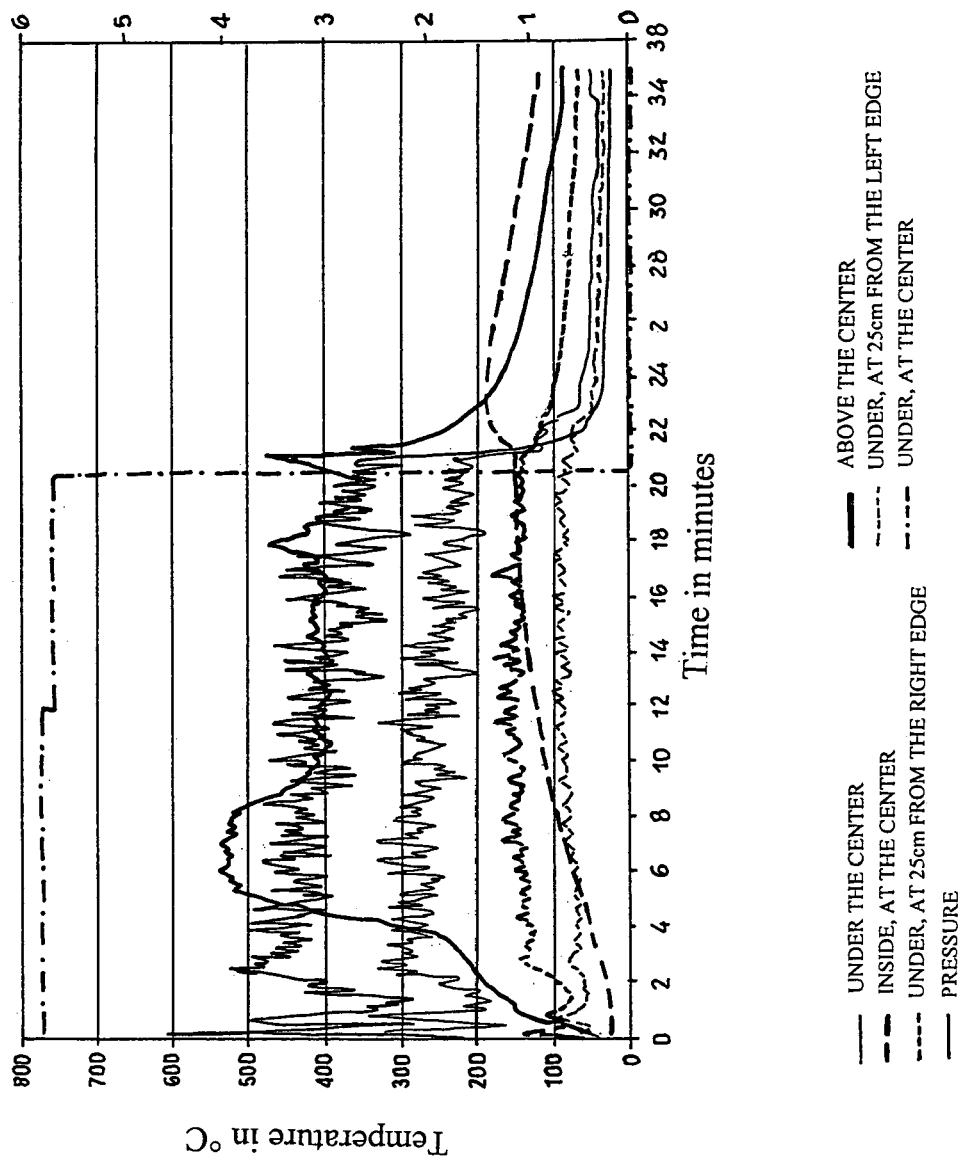

In the test No. 3, the tube became permeable after a period slightly larger than 20 minutes (FIG. 5).

Figure 6:
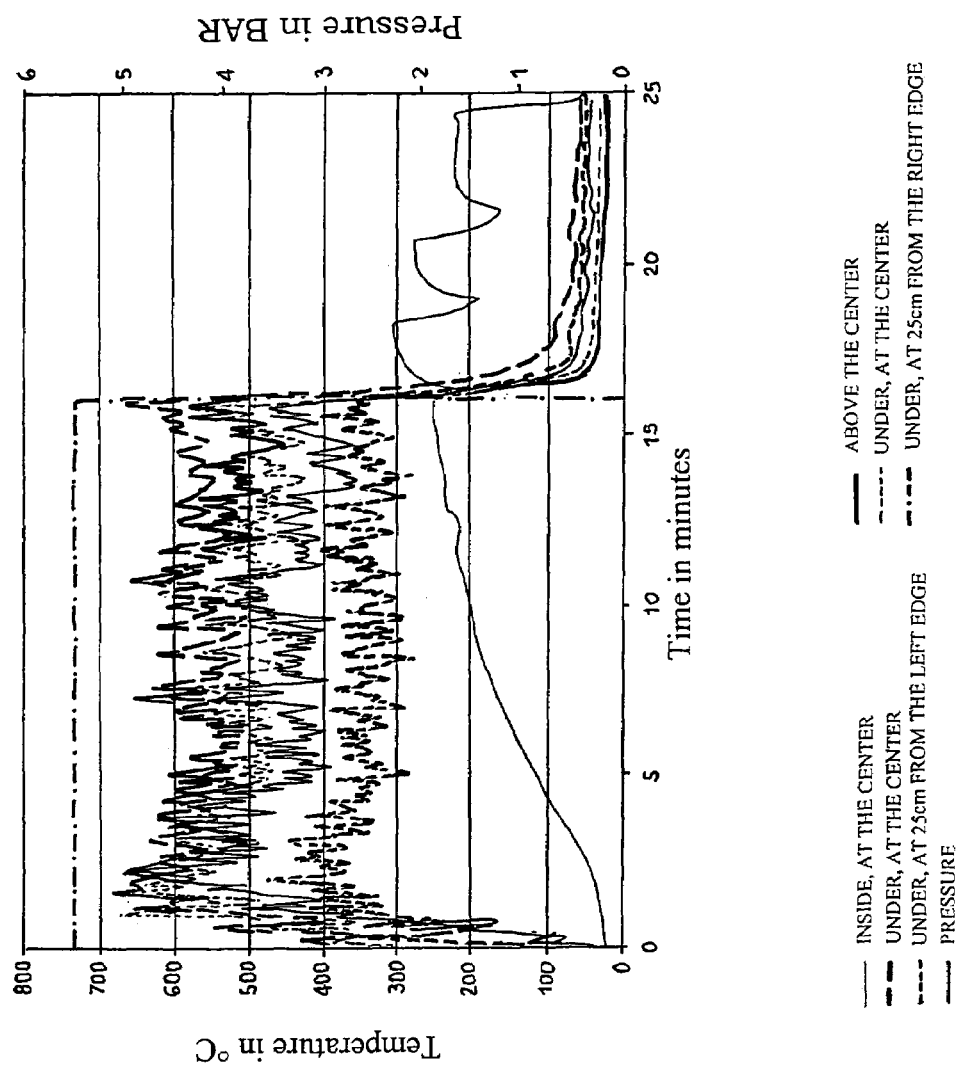

In the test No. 4, the braking system tube became permeable after a period slightly larger than 16 minutes. The evolvement of the inner temperature curve reflects the fact that the tube continued to heat after having become permeable, even if the flame was removed. (Because of the hot air and heat radiation to the inside of the tube). Then, cooling air was been blown-in to cool the tube, thereby providing the disclosed temperature curve (FIG. 6).

Figure 7:
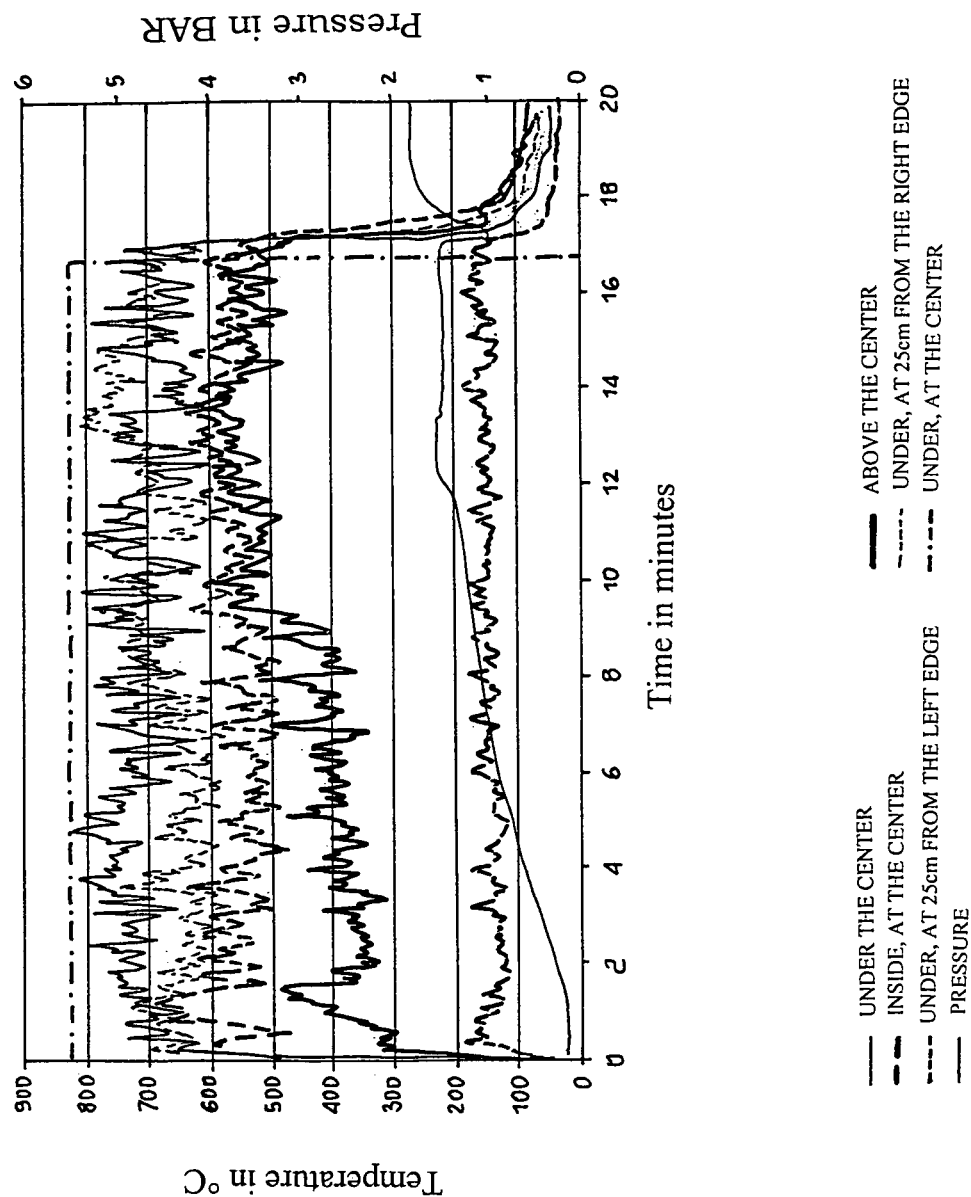

In the test No. 5, the tube became permeable after about 17 minutes (FIG. 7).

Also in this last test, the tube heats after having removed the flame.

However, the heating, also observed in the three previous tests, was negligible in this case, since the tube became permeable starting from this moment.

To establish that the heating was not caused by the inner burner, the tube was opened by cutting through it and analyzed after cooling. Thus, it was found that the smooth tube substrate 2 did not have any burning traces, in any of the mentioned tests 1 to 5.

In the following table 1, where all the time indications are related to the start of the burning in each test, the average values and standard differences of the measurement results and flame measurements and temperatures on the tube were collected.

As it should be apparent from the previous diagrams and measurement values, the temperature inside the tube increases on flame in a substantially linear manner up to respective end point, since the respective end temperature of the inside of the tube is herein indicated.

Moreover, the related pressure stress, i.e. the inner air overpressure is also indicated.

From the comparatively large triangle burner and the distance between the burner and tube, it is well evident apparent that the flames flare-up whereas under the tube a variable flame temperature is generated.

TABLE 1 average values and standard temperature variations, and pressure performance in related tests

| Definition of the test | Flame Temp. (under the center of the tube 1) Average value | Flame Temp. (under the center of the tube 2) Average value | Flame Temp. (at 25 cm from the left edge) ° C. Average value | Flame Temp. (at 25 cm from the right edge) ° C. Average value | End Temp. inside the tube ° C. | Overpressure inside the tube, in bar |
|---|---|---|---|---|---|---|
| Test 1 (Diagram 1) | 535 (106) | 592 (124) | 549 (127) | 371 (91) | 235 | 5 bars up to minute 17 |
| Test 2 (Diagram 2) | 299 (50) | 292 (38) | 295 (55) | 134 (54) | 208 | 5 bars up to minute 17 |
| Test 3 (Diagram 3) | 259 (39) | 409 (53) | 81 (11) | 142 (21) | 145 | 5 bars up to minute 20 |
| Test 4 (Diagram 4) | 558 (65) | 496 (65) | 346 (41) | 438 (94) | 251 | 5 bars up to minute 16 |
| Test 5 (Diagram 5) | 559 (50) | 675 (70) | 149 (17) | 709 (70) | 221 | 5 bars up to minute 17 |

In the above table, the flame temperature measurement points, under the tube with the respective maximum temperatures, are shown on a gray background, since these temperatures are decisive with respect to the tube thermal stress.

In the test No. 1, the average value of the flame temperature (on a gray background) is of about 590° C., and the tube became permeable after about 17 minutes at a tube inner temperature of 235° C.

In the second and third tests, the tube was stressed by a more disadvantageous flame position (with respect to the tube) with smaller temperatures, and, accordingly, this data was not further considered in the following evaluations.

In the fourth test, the flame average temperature was 560° C., and the tube inner temperature 251° C.

In the fifth test, the maximum flame temperature was measured at a distance of 25 cm from the right end.

The inner tube temperature was measured at the middle of the tube and, accordingly, in the fifth test an inner tube temperature presumably excessively small was measured. This could be also deduced from the temperature curve of the diagram 6.

At larger flame temperatures in tests No. 4 and No. 5, the tube also became permeable, for an inner pressure of 5 bars, only after 16/17 minutes.

The following Table 2 shows the data related to the tests performed at the highest flame temperature.

TABLE 2 temperature average values and standard variations and pressure performance in the tests performed with the highest flame temperatures.

| Definition of the test | Flame Average Temp. ° C. Average value | End Temp. in the inside of the tube | Overpressure in the inside of the tube, in bars |
|---|---|---|---|
| Test 1 (Diagram 1) | 592 (124) | 235 | 5 bars up to minute 17 |
| Test 4 (Diagram 4) | 558 (53) | 251 | 5 bars up to minute 16 |
| Test 5 (Diagram 5) | 709 (70) | 221 | 5 bars up to minute 17 |

For flame temperatures from 560 to 710° C., the tubes, which were tested at a tube inner pressure of 5 bars, resisted against burning for a time from 16 to 17 minutes; and the inside of the tubes achieved a maximum temperature of 250° C.

Figure 8:
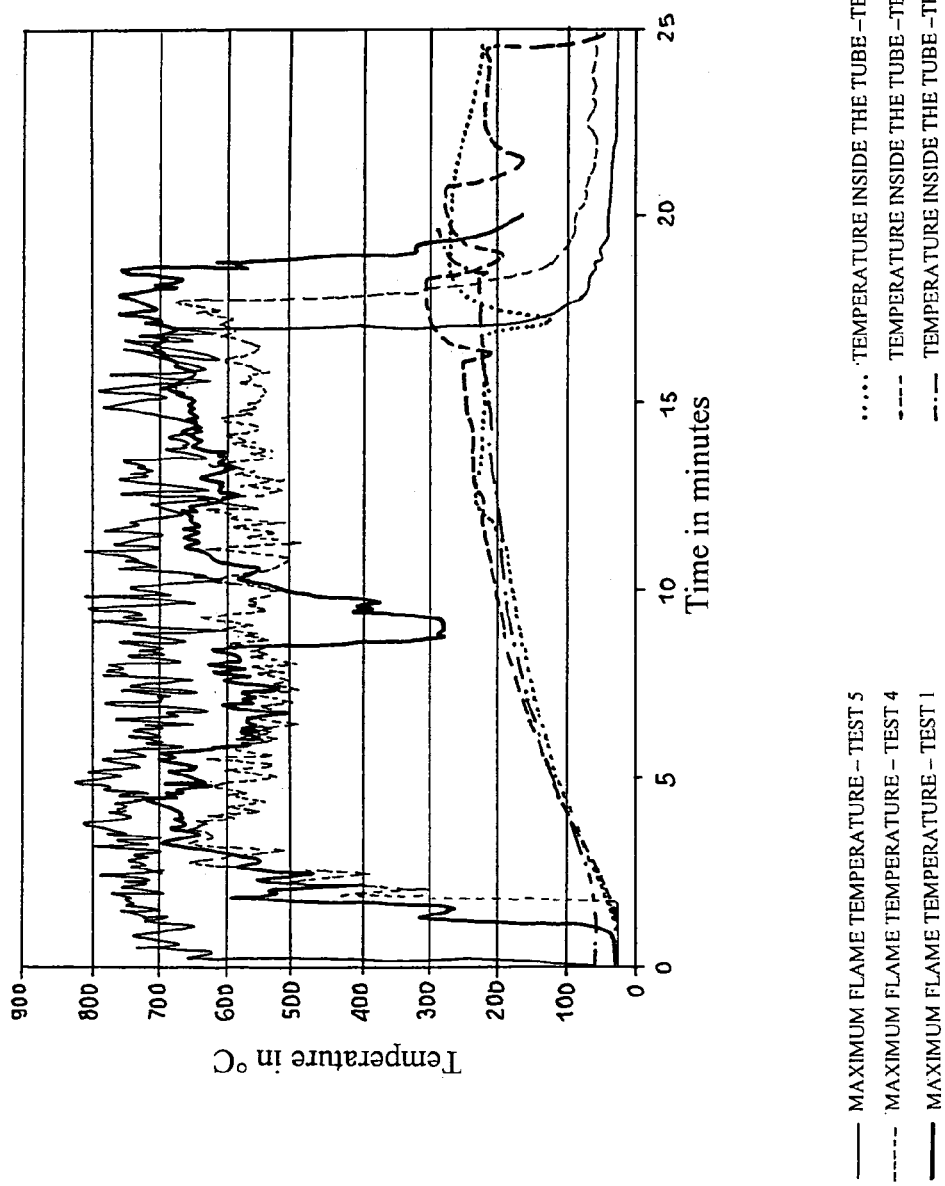
FIG. 8 shows the variation of the flame and inner temperature of the tube in tests according to FIGS. 3 to 6, at the highest flame temperature values.

The results, which depend on the testing time at the highest flame temperature, are shown in FIG. 8. The diagrams of this figure clearly show the inner tube temperature increase and the related flame temperature based on the time interval. Only the highest flame temperature tests have been herein represented. From these curves it is apparent that, notwithstanding the high flame temperature, the inner tube temperature slightly increases up to a switching of the tube to a permeable condition.

Moreover, from the above tests it is apparent that the tested tubes are capable of resisting against a temperature stress corresponding to an average flame temperature from 560 to 710° C., under an inner pressure of 5 bars, for at least 15 minutes. Thus, the "functionality" or efficiency of the tube is held unaltered for a period of 15 minutes.

The invention claimed is:

1. A tube for pressurized air braking systems, said tube comprising a smooth synthetic rubber material sublayer, a plurality of rubberized fiber fabric reinforcement elements overlapped onto one another and arranged above said sublayer, said rubberized fiber fabric reinforcement elements being rubberized by rubber material which is the same material that forms said sublayer, said rubberized fiber fabric reinforcement elements having a further synthetic rubber layer coating said plurality of overlapped rubberized fiber fabric reinforcement elements made of the same rubber material as that of said sublayer and having on said further synthetic rubber layer, a heat resistant layer, said heat resistant layer being made of a silicon based fiber material comprising glass fibers, silicon fibers, ceramic fibers or mixtures thereof, said heat resistant layer being coated by a synthetic rubber outer layer made of the same rubber material as that of said sublayer, thereby said tube has a pressure resistance up to 5 atm, and a heat resistance temperature up to 700-800° C. for a free flame exposition of at least 15 minutes.

2. A tube according to claim 1, wherein said synthetic rubber layers are made of synthetic compounds of flame resistant elastomeric materials, according to the Class 3 AFNOR NF F16-101 and DIN 5510-2 Standards.

3. A tube according to claim 1, wherein said tube comprises a further synthetic rubber layer coating said heat resistant material layer, and an additional layer also made of a heat resistant material, arranged above said further synthetic rubber layer.

4. A tube according to claim 3, wherein said additional heat resistant material layer is also made of a silicon or ceramics based fiber material.

* * * * *